United States Patent
Kharboutly et al.

(10) Patent No.: US 10,902,628 B1
(45) Date of Patent: Jan. 26, 2021

(54) METHOD FOR ESTIMATING USER EYE ORIENTATION USING A SYSTEM-INDEPENDENT LEARNED MAPPING

(71) Applicant: Mirametrix Inc., Montreal (CA)

(72) Inventors: Mohamad Kharboutly, Montreal (CA); Anh Tuan Nghiem, Beaconsfield (CA); Nicolas Widynski, Montreal (CA)

(73) Assignee: Mirametrix Inc., Montreal (CA)

( * ) Notice: Subject to any disclaimer, the term of this patent is extended or adjusted under 35 U.S.C. 154(b) by 38 days.

(21) Appl. No.: 16/449,191

(22) Filed: Jun. 21, 2019

Related U.S. Application Data

(60) Provisional application No. 62/688,678, filed on Jun. 22, 2018.

(51) Int. Cl.
| | |
|---|---|
| *G06K 9/00* | (2006.01) |
| *G06T 7/70* | (2017.01) |
| *G06T 7/20* | (2017.01) |
| *G06F 3/01* | (2006.01) |
| *G06N 20/00* | (2019.01) |
| *G06F 17/18* | (2006.01) |
| *G06K 9/46* | (2006.01) |

(52) U.S. Cl.
CPC ............... *G06T 7/70* (2017.01); *G06F 3/012* (2013.01); *G06F 17/18* (2013.01); *G06K 9/00228* (2013.01); *G06K 9/4671* (2013.01); *G06N 20/00* (2019.01); *G06T 7/20* (2013.01); *G06T 2207/30041* (2013.01)

(58) Field of Classification Search
None
See application file for complete search history.

(56) References Cited

U.S. PATENT DOCUMENTS

| | | | | |
|---|---|---|---|---|
| 6,659,611 | B2* | 12/2003 | Amir | A61B 3/113 |
| | | | | 351/210 |
| 7,306,337 | B2* | 12/2007 | Ji | G06F 3/013 |
| | | | | 351/209 |

(Continued)

FOREIGN PATENT DOCUMENTS

| | | | |
|---|---|---|---|
| CN | 103356163 A | * | 10/2013 |
| CN | 103356163 A | | 10/2013 |

OTHER PUBLICATIONS

Component-wise POSE normalization for POSE-Invariant Face Recognition, Shan Du et al., IEEE, 978-1-4244-2354-5, 2009, pp. 873-876 (Year: 2009).*

(Continued)

*Primary Examiner* — Jayesh A Patel
(74) *Attorney, Agent, or Firm* — Blake, Cassels & Graydon LLP; Laurie Wright; Christopher Hunter

(57) ABSTRACT

A method is provided for estimating the orientation of a user's eyes in a scene in a system-agnostic manner. The method approximates pose-invariant, user-independent feature vectors by transforming the input coordinate to a pose-invariant coordinate and then normalizing the data considering the statistical distributions of previously collected data used to create a learned mapping method. It then uses the learned mapping method to estimate the orientation of the user's eyes in the pose invariant coordinate system, and finalizes by transforming these to a world coordinate system.

27 Claims, 7 Drawing Sheets

(56) References Cited

U.S. PATENT DOCUMENTS

| | | | | |
|---|---|---|---|---|
| 8,457,352 | B2* | 6/2013 | Hennessey | G06K 9/00604 382/103 |
| 8,885,882 | B1* | 11/2014 | Yin | G06K 9/00248 382/103 |
| 10,635,167 | B2* | 4/2020 | Kempinski | G06K 9/00906 |
| 2015/0210546 | A1* | 7/2015 | Song | B01J 19/0066 252/182.1 |
| 2018/0005018 | A1* | 1/2018 | Young | G06K 9/00228 |
| 2018/0005021 | A1* | 1/2018 | Young | G06K 9/00248 |
| 2018/0068414 | A1* | 3/2018 | Savvides | G06T 17/20 |

OTHER PUBLICATIONS

Wang, J. et al.; "2D Gaze Estimation Based on Pupil-Glint Vector Using an Artificial Neural Network"; Applied Sciences; 6, 174; Jun. 2016.

Varsha, P. et al.; "Eye Gaze Tracking System Using Neural Networks"; International Journal of Review in Electronics and Communications Engineering (IJRECE); vol. 2, No. 2; Apr. 2014.

Gneo, M. et al.; "A free geometry model-Independent neural eye-gaze tracking system"; Journal of Neuroengineering and Rehabilitation; 9:82; Nov. 2012.

Torricelli, D. et al.; "A Novel Neural Eye Gaze Tracker"; Jan. 2006.

Torricelli, D. et al.; "A neural-based remote eye gaze tracker under natural head motion"; Computer Methods and Programs in Biomedicine; 92; pp. 66 to 78; Nov. 2008.

Back, D.; "Neural Network Gaze Tracking using Web Camera"; PhD Thesis; Linköping University; Dec. 2005.

Cheung, Y. et al.; "Eye Gaze Tracking With a Web Camera in a Desktop Environment"; IEEE Transactions on Human-Machine Systems; vol. 45, No. 4; pp. 1 to 12; Aug. 2015.

Skodras, E. et al.; "On Visual Gaze Tracking Based on a Single Low Cost Camera"; Signal Processing: Image Communication; 36; Apr. 9, 2015.

Skodras, E.; "Facial Feature Extraction and Estimation of Gaze Direction in Human-Computer interaction"; PhD Thesis; University of Patras; Nov. 2016.

Wild, D.J.; "Gaze Tracking Using a Regular Web Camera"; Bachelor of Science Thesis; Rhodes University; Nov. 2012.

Sewell, W. et al.; "Real-Time Eye Gaze Tracking With an Unmodified Commodity Webcam Employing a Neural Network"; Proceedings of the 28th International Conference on Human Factors in Computing Systems, CHI 2010; Extended Abstracts; Apr. 12-13, 2010.

Baluja, S. et al.; "Non-Intrusive Gaze Tracking Using Artificial Neural Networks"; Advances in Neural Information Processing Systems; 7th NIPS Conference; Jan. 1993.

Zhang, X. et al.; "Appearance-based Gaze Estimation in the Wild"; Conference on Computer Vision and Pattern Recognition (CVPR); Jun. 2015.

George, A. et al.; "Real-time Eye Gaze Direction Classification Using Convolutional Neural Network"; May 2016.

Krafka, K. et al.; "Eye Tracking for Everyone"; IEEE Conference on Computer Vision and Pattern Recognition (CVPR); Jun. 2016.

Stiefelhagen, R. et al.; "Tracking Eyes and Monitoring Eye Gaze"; Oct. 1999.

Holland, C. et al.; "Eye Tracking on Unmodified Common Tablets: Challenges and Solutions"; ACM Eye Tracking Research & Applications Symposium (ETRA); Mar. 2012.

Tan, K. et al.; "Appearance-based Eye Gaze Estimation"; Applications of Computer Vision (WACV); Dec. 4, 2002.

Casil, R. et al.; "Eye Gaze Direction Classification Using Artificial Neural Network";. Institute of Electronics Engineers of the Philippines (IECEP) Journal; vol. 2, No. 1; pp. 22 to 26; Jun. 2013.

* cited by examiner

METHOD FOR ESTIMATING USER EYE ORIENTATION USING A SYSTEM-INDEPENDENT LEARNED MAPPING

CROSS-REFERENCE TO RELATED APPLICATION(S)

This application claims priority to U.S. Provisional Patent Application No. 62/688,678 filed on Jun. 22, 2018, the contents of which are incorporated herein by reference.

TECHNICAL FIELD

The present invention relates generally to a method for estimating user eye orientation using a system-independent learned mapping.

BACKGROUND

Currently, there are a number of solutions for tracking a user's gaze reliably, which for brevity can be divided into hardware-specific and hardware-agnostic approaches.

Note that throughout this document, when hardware or hardware systems are mentioned, this is referring to a device, module, or sub-system having a sensor or sensors, and any embedded processing systems used to obtain data corresponding to a user's eye orientation. For high-complexity systems having embedded processors, this hardware may perform the full processing to estimate user eye orientation; in low-complexity systems, it may simply correspond to a sensor and interface for transferring data to a separate module, which performs the eye orientation estimation. Examples of this could range from a simple webcam to a multi-camera device with embedded processors to perform all required processing.

With respect to the hardware-specific approaches, these approaches often maintain a list of assumptions about the data received, tied explicitly to the hardware system used. An example of this can be found in U.S. Pat. No. 8,457,352 B2, where multiple light sources are shone on the scene (and, in effect, the user), creating a number of key image features that can then be tracked.

These image features are then either fed to a learned mapping or to a geometric model, where the user-specific or general user eye orientation is then estimated.

As the hardware complexity of the input system increases, these approaches can usually provide reliable estimates, both in terms of pose- and user-independent information (i.e. general user eye orientation or optical axis estimation), as well as pose-independent, but user-specific information (i.e. visual axis estimation). In these scenarios, the main drawback to the solution is that they are cost prohibitive and hardware-specific, making them unrealistic for usage in general consumer electronics, where cost is limited and the product development process can introduce significant changes in a hardware design. See, for example: U.S. Pat. No. 6,659,611 B2, U.S. Pat. No. 7,306,337 B2, or CN 103356163 B.

As the hardware complexity of the input system decreases, these approaches tend to return to interpolation-based mapping methods upon a small number of key image features (such as Wang2016, Varsha2014, Gneo2012). These solutions tend to be deficient in two aspects: first, they are found to be unable to provide a user-independent estimation of eye orientation, instead requiring a successful calibration to create a user-specific mapping; and second, they are often pose-dependent, as the image features that are tracked usually vary sufficiently that the user-specific mapping degrades as user pose changes.

Because of the above, a number of methods have been devised that attempt to be hardware-agnostic. These approaches can be divided into feature-based, user-specific mapping methods, and image-based, user-independent mapping methods.

In the former case, the general approach taken by the hardware-complex systems is considered (e.g. Torricelli 2008, Back 2006, Cheung 2015, Skoras 2016, Wild 2012). A sample system would detect a user, extract a number of eye and facial features, and then feed a feature vector calculated from these to a user-specific interpolation-based mapping, to estimate the user's eye orientation. This kind of approach tends to maintain the issues inherent with hardware-specific, low-complexity approaches.

Regarding image-based user-independent mapping methods: the majority of the proposed approaches thus far follow the process of detecting the user, extracting the image subregion associated with their eye(s), and feeding it to a learned mapping method (Sewell 2010, Baluja 1993, Zhang 2015, George 2016, Krafka 2016, Stiefelhagen 1999, Holland 2012, Tan 2002, Casil, 2013). This has the advantage of running on standard webcams and other very low-cost hardware in estimating a general user orientation. However, in using a subregion of the input image, the training method now would need to account for any possible user pose in its estimation—a task which would require a vast amount of data to provide a truly robust solution. Additionally, the use of direct input data ties the learned mapping to the input hardware used. Thus, unless a vast amount of data from all kinds of different sensor types (e.g. RGB, IR, time-of-flight), resolutions, and sensor quality are used, the learned mapping method is bound to remain hardware-dependent.

It would be desirable to have a mapping method for estimating a subject's eye orientation that was agnostic to the system used and to the person using it. In doing so, the method could be used on any system, regardless of its hardware complexity. Additionally, it would be able to provide a general estimation of where any user is looking, not being constrained to a user-specific calibration. Such a method could be used as a final estimation of eye orientation for low-complexity systems, but also as an initial estimation for high-complexity systems, with follow-up methods used to refine the eye orientation estimation considering the additional information available, or calibrating for an individual user.

SUMMARY

The following addresses the above by providing a method for estimating user eye orientation, which provides a system-independent learned mapping that can be trained on many users for a general user orientation estimation, or trained on a specific user to provide a user-specific estimation.

In one aspect, there is provided a method of estimating the orientation of a user's eyes in a scene using one or more learned mappings, comprising: receiving coordinates of one or more facial and eye features of at least one eye of the user, in a defined coordinate system corresponding to an input coordinate system; receiving a first mapping method that maps data from the input coordinate system to a predefined coordinate system, defined such that positions of the one or more facial and eye features do not vary due to user rotation or translation in a world coordinate system, corresponding to a pose invariant coordinate system; receiving a second mapping method that maps data from the pose invariant coordinate system to the world coordinate system; transforming the facial and eye feature coordinates from the input coordinate system to the pose invariant coordinate system using the first mapping method; computing one or more feature vectors out of the transformed facial and eye feature coordinates; normalizing the one or more feature vectors considering statistical distributions of the data used to train the one or more learned mappings; feeding the one or more normalized feature vectors to one or more learned mappings, the mappings having been trained to output the orientation information of one or more of the user's eyes in the pose invariant coordinate system; and determining the position and orientation of one or more of the user's eyes in the world coordinate system, using the orientation information of the user's eyes in the pose invariant coordinate system and the second mapping method.

In another aspect, there is provided a non-transitory computer readable medium comprising computer executable instructions for estimating the orientation of a user's eyes in a scene using one or more learned mappings, comprising instructions for: receiving coordinates of one or more facial and eye features of at least one eye of the user, in a defined coordinate system corresponding to an input coordinate system; receiving a first mapping method that maps data from the input coordinate system to a predefined coordinate system, defined such that positions of the one or more facial and eye features do not vary due to user rotation or translation in a world coordinate system, corresponding to a pose invariant coordinate system; receiving a second mapping method that maps data from the pose invariant coordinate system to the world coordinate system; transforming the facial and eye feature coordinates from the input coordinate system to the pose invariant coordinate system using the first mapping method; computing one or more feature vectors out of the transformed facial and eye feature coordinates; normalizing the one or more feature vectors considering statistical distributions of the data used to train the one or more learned mappings; feeding the one or more normalized feature vectors to one or more learned mappings, the mappings having been trained to output the orientation information of one or more of the user's eyes in the pose invariant coordinate system; and determining the position and orientation of one or more of the user's eyes in the world coordinate system, using the orientation information of the user's eyes in the pose invariant coordinate system and the second mapping method.

In yet another aspect, there is provided a system for estimating the orientation of a user's eyes in a scene using one or more learned mappings, the system comprising a processor and memory, the system storing computer executable instructions that when executed by the processor cause the system to: receive coordinates of one or more facial and eye features of at least one eye of the user, in a defined coordinate system corresponding to an input coordinate system; receive a first mapping method that maps data from the input coordinate system to a predefined coordinate system, defined such that positions of the one or more facial and eye features do not vary due to user rotation or translation in a world coordinate system, corresponding to a pose invariant coordinate system; receive a second mapping method that maps data from the pose invariant coordinate system to the world coordinate system; transform the facial and eye feature coordinates from the input coordinate system to the pose invariant coordinate system using the first mapping method; compute one or more feature vectors out of the transformed facial and eye feature coordinates; normalize the one or more feature vectors considering statistical distributions of the data used to train the one or more learned mappings; feed the one or more normalized feature vectors to one or more learned mappings, the mappings having been trained to output the orientation information of one or more of the user's eyes in the pose invariant coordinate system; and determine the position and orientation of one or more of the user's eyes in the world coordinate system, using the orientation information of the user's eyes in the pose invariant coordinate system and the second mapping method.

BRIEF DESCRIPTION OF THE DRAWINGS

Embodiments will now be described with reference to the appended drawings wherein.

DETAILED DESCRIPTION

Figure 1:
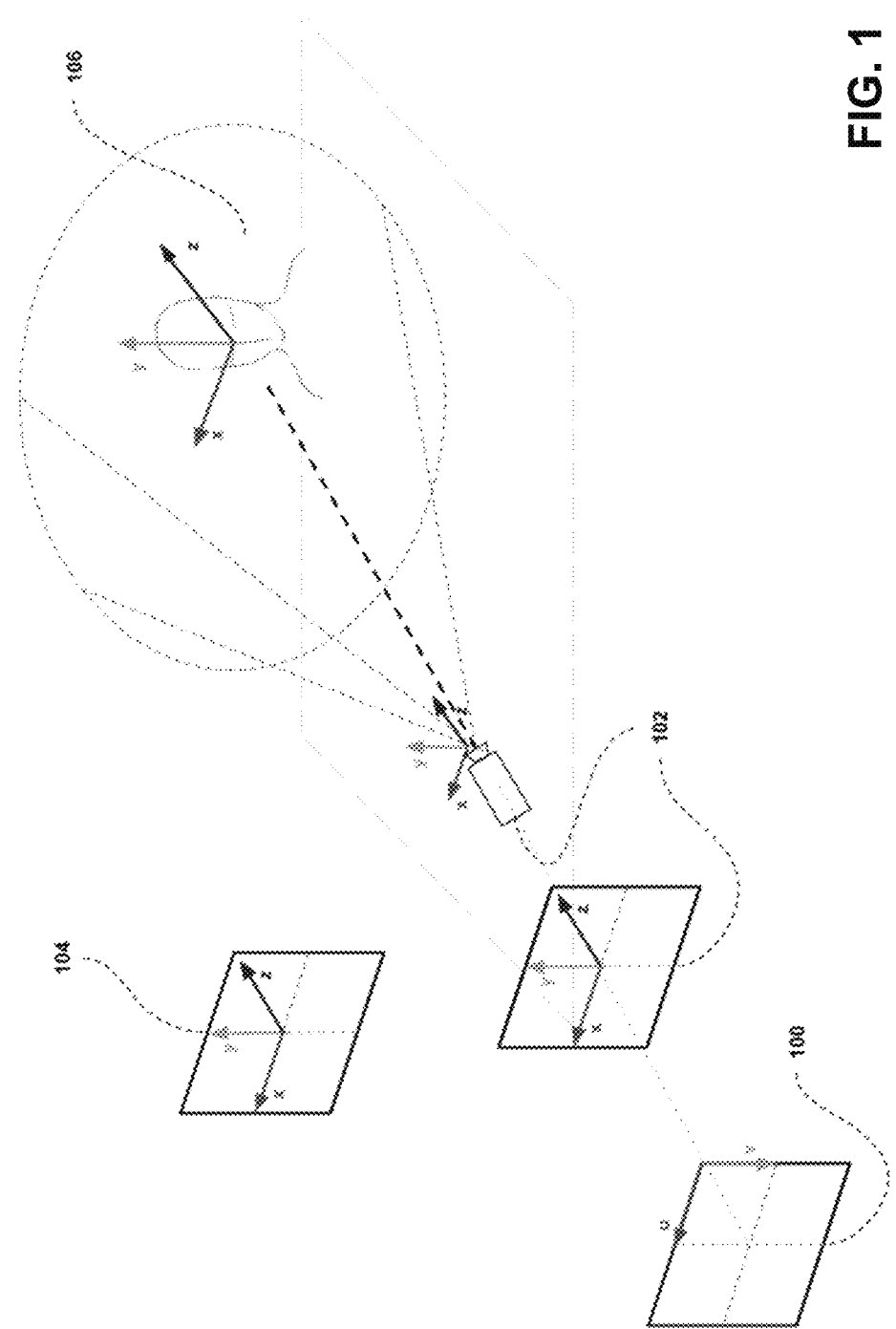
FIG. 1 shows a sample scene and illustrates the different coordinate systems considered for the implementing the system.

The following is directed to a method and system for estimating user eye orientation using a system-independent learned mapping.

The following provides a method for estimating the orientation of a user's eyes in a scene using a camera-agnostic mapping. The method receives as input one or more eye and facial feature coordinates of the user, a mapping method from the input coordinate system associated with said coordinates to a Pose Invariant Coordinate System (defined such that that the coordinate of the features do not vary due to user rotation or translation), and a mapping method from the Pose Invariant Coordinate System to a predefined pose-invariant coordinate system. The method first transforms the input data to be pose-invariant, by using the first mapping method. It then computes one or more feature vectors from the coordinates and normalizes the data using the statistical distributions of input data used to create the learned mapping. Then, the normalized feature vectors are fed to the learned mapping method, which outputs an eye orientation estimate in the pose-invariant coordinate system. Lastly, the estimated eye orientations are transformed to the world coordinate system using the second mapping, where they can be used by other methods.

By virtue of the method's form, it will often be applicable to use a learned mapping that has been trained on many users, so as to provide an average estimation of a user's eye orientation. While this is the case, the system described herein should not be considered as restricted to such an approach. The learned mapping could instead be trained considering only data from a single user, to provide a more accurate estimation for that individual user (at the cost of accuracy for any other user). Alternatively, the learned mapping can be trained on the data of many users, and complemented by a user-specific mapping that takes as input the output of the first mapping. In this manner, the system can be complemented with a more standard gaze tracking approach, where the second mapping is in effect the correction from a user's optical axis eye orientation to their visual axis eye orientation.

Another optional implementation of the system described herein would involve taking the multiple output eye orientations (computed from the multiple normalized feature vectors), and computing a weighted average final eye orientation estimate using a given set of weights. These weights could additionally be determined on a per-user basis, effectively functioning as an alternate user-specific eye orientation output. These weights could also be dynamically set considering the user's pose, as some feature vectors may be more robust and accurate at specific poses.

The system described herein differentiates itself from existing solutions in that (a) it ensures the resulting estimation is user pose independent while using a hardware-agnostic mapping, (b) it minimizes the amount of training data needed to create the learned mapping by decoupling potential sources of input variability; and (d) it improves the robustness of the learned mapping by limiting the potential solution space of the learned mapping.

The overall method described is structurally distinct from other available solutions in that (a) it does not rely on any hardware-specific features or landmarks to function; (b) it removes hardware-specific information from its data at the beginning of the method (and as a dependency from the learned mapping method), by considering input feature coordinates and converting said coordinates to the world coordinate system; (c) it removes pose criteria as a dependency from the learned mapping method by converting feature vectors created from said coordinates to a pose-invariant coordinate system; and (d) it minimizes user-dependence from the learned mapping method by normalizing said feature vectors considering the statistical distribution of the data used to train the learned mapping.

Among other things, it is an object of the present invention to provide a method for estimating user eye orientation that does not suffer from any of the problems or deficiencies associated with prior solutions. It is still further an object of the present invention to provide a method for training an eye orientation estimation mapping, that can be used with any hardware provided.

FIG. 1 illustrates the different coordinate systems involved in the presently described system, as they are important to the method's ability to ensure a system-independent, user-agnostic approach. In it, one can see a first coordinate system 100, which corresponds to the data as received by the imaging system used to view the user in the scene; this coordinate system will be hereby denoted the Image Coordinate System. Generally speaking, any data or features from this coordinate system can be abstracted away from the specifics of the scene itself. To convert from this input-specific information to something more closely aligned to the real-world scene, any data received is converted to a Camera Coordinate System, 102. Here, some model of the imaging system is used to estimate the aspects of the scene from which light rays reflected off, and entered the imaging system. For example, for a monocular camera system an object of a known physical size may be detected in the image. Given its known size, its size in the image, and a camera projection, the distance and position of the object relative to the camera can be determined. In some embodiments, the camera can be modeled as a simple pinhole camera model, and thus the camera projection used would correspond to the camera intrinsics of a pinhole camera.

From the Camera Coordinate System 102, the data originally received is now located in a coordinate system representative of the real-world scene. However, such information is tied to the camera, and as such this coordinate system uses as origin the camera's position in the scene. Often, the real-world scene is of interest relative to some other origin position and orientation. As such, a World Coordinate System 104 is considered. In an embodiment considering a single camera, the relationship between 102 and 104 is one of translation and rotation—no additional projection models are necessary.

Lastly, there exists a Pose Invariant Coordinate System 104. This coordinate system can be defined in numerous ways, but its key aspect is that it is linked to the user being imaged, such that the coordinate system does not vary based on user rotation or translation in the scene. An exemplary embodiment of such a coordinate system is a user face coordinate system, where a face center position and face orientation are computed in the World Coordinate System 104. With this, any data from coordinate system 104 can be converted to 106 via a rotation to align with the face orientation, followed by a translation to set the position relative to the face center position, such that it is the coordinate system origin.

Figure 2:
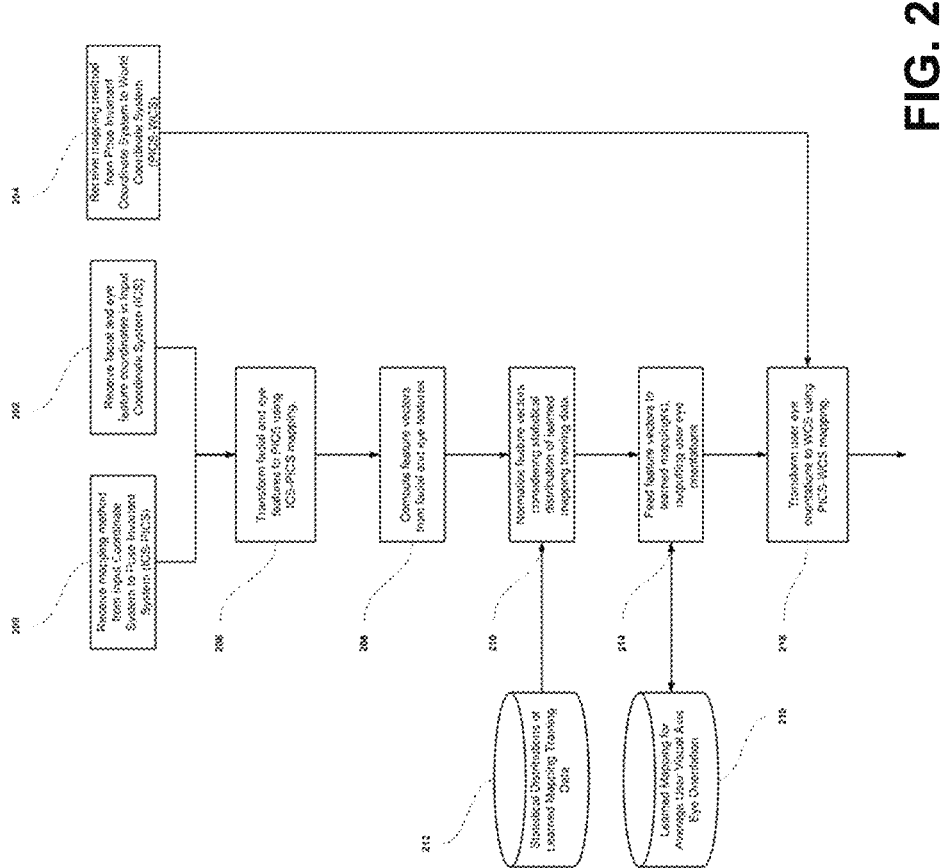
FIG. 2 shows the steps describing the overall eye orientation estimation method implemented by the system.

FIG. 2 demonstrates the general steps involved in the invention. The method assumes as an input, a mapping method 200, from an Input Coordinate System (ICS) to the Pose Invariant Coordinate System (PICS); facial and eye feature coordinates 202 in said ICS; and a mapping method 204, from the the PICS to the World Coordinate System (WCS). Note that here an Input Coordinate system is mentioned, rather than specifying from the scene described in FIG. 1. This is notable, since the ICS could be data in the Image Coordinate System 100, the Camera Coordinate System 102, or some separate coordinate system. While in some monocular camera systems feeding the feature coordinates in the Image Coordinate System 100 may make sense, a simple alternate case could be a depth sensing system. In such a case, there are likely images being collected, but the input data fed will have been processed considering some information related to the light being shone on the user (such as a structured light pattern, or knowledge of the time it took for light to return to the pixel, such as in a Time-of-Flight sensor). Thus, the Input Coordinate System is not required to be the Image Coordinate System 100.

With the described input, the method for eye estimation involves first transforming the feature coordinates to the Pose Invariant Coordinate System, in step 206. This is achieved by using the first mapping method 200. In doing so, the system is attempting to remove or minimize any pose-based variation in the features of interest. This ensures that the relationship between any two feature coordinates is due only to feature motion, rather than potentially being biased by a change in the orientation or position of the user relative to the Input Coordinate System. As an example, let one consider a user's left eye and its pupil center and inner and outer eye corners. If a user looking straight ahead rotates his or her head by 45 degrees to the left (with his/her eyes fixed looking ahead of him/her), the distance between the pupil center and both eye corners will shrink, when looking at the coordinates in the Input Coordinate System. If considering their coordinates in the Pose Invariant Coordinate system, they should not change.

In step 208, the feature coordinates are considered, and feature vectors are computed from these. These feature vectors will eventually be fed to the learned mapping method, so the objective is for them to be representative of any change in the orientation of the eye (or eyes) being considered. Generally speaking, each feature vector will correspond to a 2D or 3D vector, computed from feature coordinates corresponding to an anchor point, and other feature coordinates corresponding to an orientation point. This will be further elaborated in FIG. 4.

After defining the feature vectors, the next step in the method involves normalizing and scaling the feature vectors to minimize sources of variability not related to eye pose, in step 210. Two major potential sources of variability correspond to user variance (e.g. age, gender, ethnicity, age), and facial expression (e.g. user smiling vs. squinting). Using statistical distribution information 212 of the training data used to create our learned mapping method, the feature vectors can be normalized and scaled to minimize the effect of these. During the explanation of feature vectors in FIG. 4, we will discuss normalization criteria more in-depth.

Afterwards, the normalized feature vectors are fed to the learned mapping method 216, in step 214. The mapping method has been trained to take as input normalized feature vectors, and outputs the estimated eye orientation. In an exemplary embodiment, the mapping method 214 can be trained to output an average user eye orientation. The process of training the mapping method will be discussed later, in FIG. 5. Since the input coordinates are in a variant of the Pose Invariant Coordinate System (due to normalization), the output eye orientation estimates will also be in the Pose Invariant Coordinate System.

Lastly, in step 218 the mapping method 204 is used to transform the estimated eye orientations back into the World Coordinate System, where they can be used to determine what object or region of an object the user is gazing at.

Figure 3:
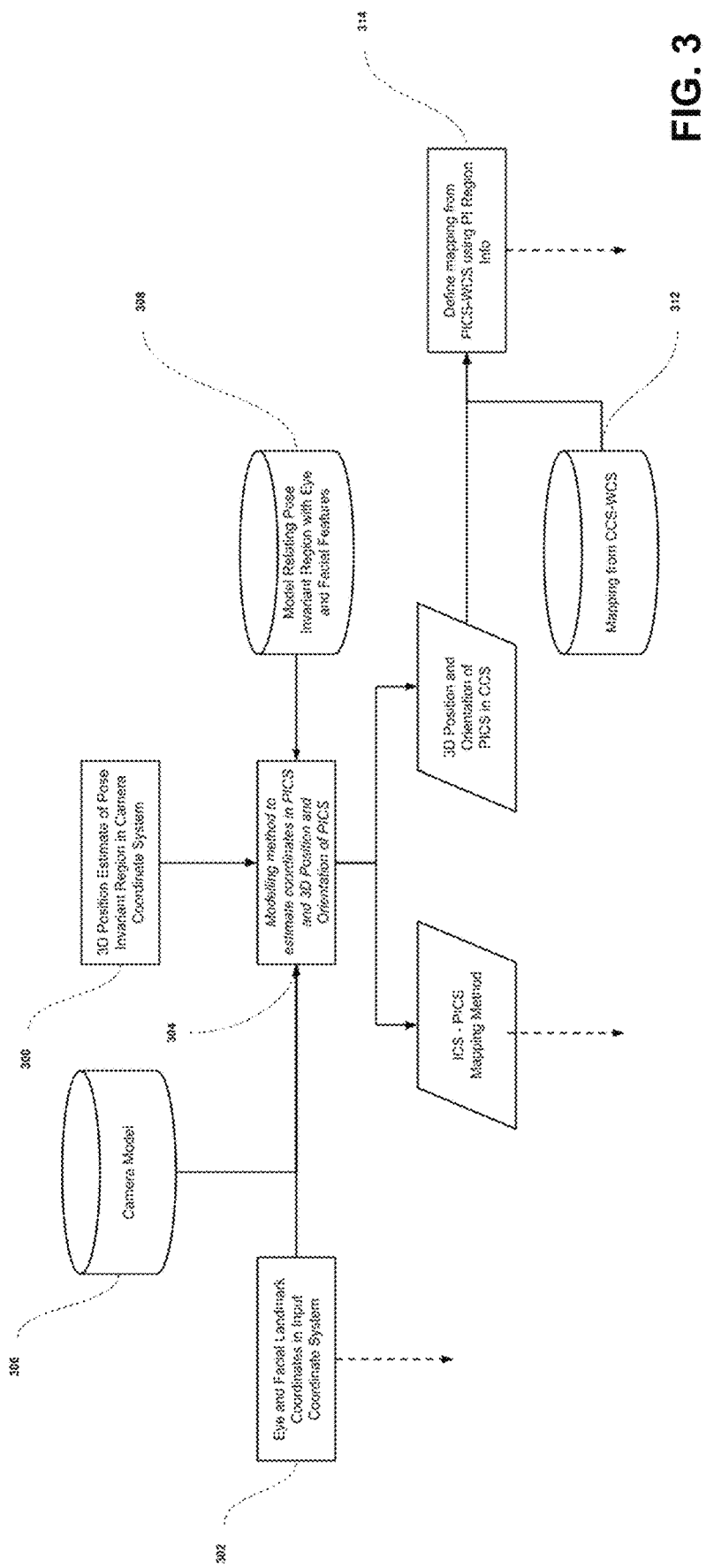
FIG. 3 shows the steps describing an exemplary embodiment of how to compute the inputs to the system.

FIG. 3 elaborates on the inputs to the described method, as well as how they may be determined in a sample embodiment. Particularly, it assumes an input 300 of the 3D position of a pose invariant region in the Camera Coordinate System 102, and input 302 eye and facial landmark coordinates in the Input Coordinate System. While the latter item 302 is easily fed directly to step 202 of the main method, the computation of mapping methods 200 and 204 are more involved. Computing the mapping from ICS to CCS (at step 304) involves knowledge of a camera projection model 306, the 3D position of the pose invariant region 300, the feature landmark coordinates 302, and a modelling method 308, defining the relationship between the received feature landmark coordinates and the pose invariant region. More specifically, the modelling method 308 contains information on the possible "configurations" of the Pose Invariant region, considering user, user pose, and user facial expression variability. It takes as input a set of landmark coordinates in the ICS, a camera projection model, and an estimated 3D position of the PICS region; models this related to possible actual PICS configurations; and outputs (i) the PICS region position and orientation in the CCS, and (ii) the landmark coordinates in the PICS.

The modelling method's output PICS region position and orientation in the CCS inherently describes a transformation method from the PICS region to the CCS; given a rotation matrix R describing the PICS orientation, and a translation t, defining its position:

$$P_{CCS} = [R|t] P_{PICS}$$

$$P_{CCS} = T_{PI-in-CCS} P_{PICS}$$

Therefore, the mapping method defined in step 304 involves (i) feeding landmark coordinates 302, 3D position of PICS region 300, and camera projection model 306 to modelling method 308; (ii) receiving the PICS landmark coordinates and transformation method $T_{PI-in-CCS}$ from the modelling method; and (iii) converting the coordinates to the CCS using $T_{PI-in-CCS}$.

Once the ICS to CCS mapping has been defined, only the mapping from CCS to WCS is missing in order to create the mapping method 200. Since a mapping from a Camera Coordinate System to a World Coordinate System generally only involves a rotation and translation, this is usually simply predefined as item 312. Then, step 310 simply has to take the CCS to WCS mapping from step 304 and cascade it with the mapping defined in item 312, creating the mapping from ICS to WCS, which can then be fed to step 200.

Lastly, step 314 involves the definition of the mapping method from PICS to WCS. This is performed by considering the 3D position and orientation of the Pose Invariant region in the Camera Coordinate System, 300, the mapping from CCS to WCS, 312, and the relationship between the Pose Invariant region and the feature coordinates, 308. This involves converting the Pose Invariant region pose from the CCS to the WCS using the mapping 312, and using the position and orientation to define a rotation and translation into the PICS. This rotation and translation is then effectively the mapping method from the PICS to the WCS.

It should be clear that the steps described in FIG. 3 can be implemented given a variety of input systems. For example, a simple monocular RGB camera system could receive a first 3D position estimate 300 by relating a face detector output to a predefined ratio-to-depth mapping. It could then run a face tracking algorithm, which would be capable of outputting the 3D position and orientation of a Pose Invariant region 300 as well as the eye and facial feature coordinates 302, by maintaining a model 308 within the algorithm. In such an embodiment, the Pose Invariant region and Pose Invariant Coordinate System would likely correspond to a Face Coordinate System, considering the rigid components of the face being tracked. Thus, 308 would correspond to this geometric model, and the camera model 306 could be a perspective projection.

In another embodiment, the input system may correspond to a depth sensor (using structured light) and an RGB camera. Here, a similar face tracking algorithm could be used, but the 3D position and orientation of a Pose Invariant region 300 would correspond to a different coordinate system from the facial feature coordinates 302. This is because the eye and facial feature coordinates would likely be determined from the RGB image feed, whereas the depth information would arise from the depth sensor. In such a scenario, an additional mapping between the camera coordinate system of the RGB sensor and that of the depth sensor would be necessary.

Figure 4:
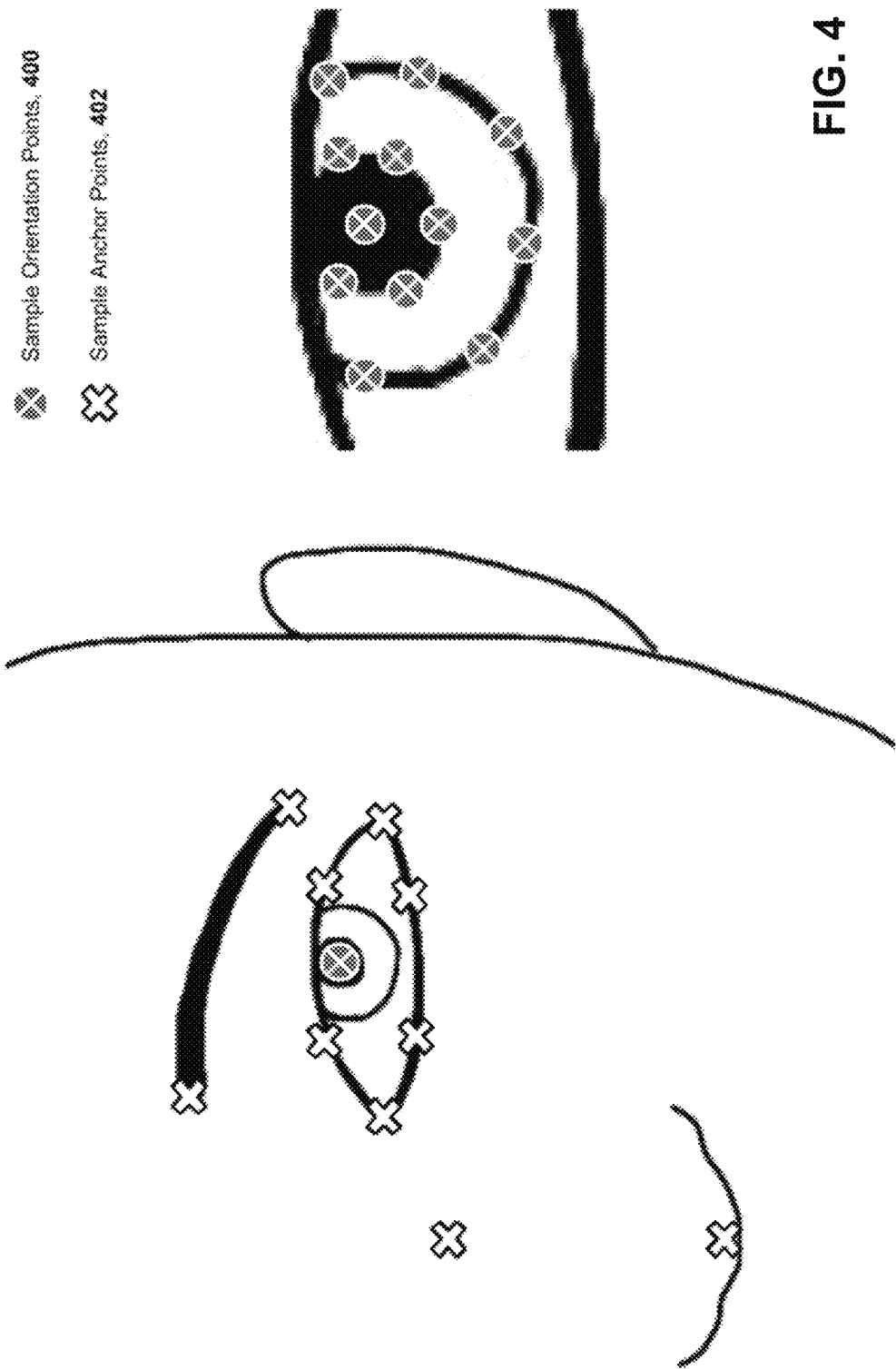
FIG. 4 shows an illustration of a user, with sample eye and facial features considered for an embodiment of the system.

With FIG. 4, the different feature vectors as well as the normalization criteria that can be considered will be elaborated. As mentioned previously, a feature vector V is generally constructed considering an anchor point, $P_a$, and an orientation point, $P_o$:

$$V = P_o - P_a$$

The purpose of the orientation point is to correlate highly with the angular variation in the user's eye pose, and correlate little to other sources of variation. The orientation point is generally straightforward to define and to detect, as the choices available are more limited and these features are generally easy to locate. The purpose of the anchor point is to bound the orientation point, and serve as an origin for the vector. With this in mind, one could understand that a theoretical best-case anchor point would be the eye center, as it allows the 2D feature vector to directly correlate to the 3D angular pose of the eye. However, reliably estimating the eye center is unrealistic, as it is not readily visible and would need to be modeled from other detectable landmark points.

The desired properties of the feature vectors, and how the algorithm aims to resolve them may now be considered. In general, the goal in choosing a feature vector (and preparing it to be fed to the learned mapping 212) is to define one which adheres to the following properties: (i) user-pose independence; (ii) low occlusion likelihood; (iii) localizability; (iv) user phenotype independence; (v) facial expression independence; and (vi) eye-pose independence (for the anchor point).

By user-pose independence, it is meant that the feature vector will not vary if only the face position or orientation is changed. This is handled by the system in step 206 of the approach, as we are converting our coordinates to a coordinate system that is expected to not vary based on user pose.

By occlusion likelihood, one may refer to the likelihood that aspects used to compute the feature vector will be occluded and not visible in certain cases (such as an extreme head pose). While it may seem like this is resolved by step 206, it should be understood that any landmark that is not visible in the original input image is extrapolated from other landmarks (either before conversion to the PICS or during), of which system would need to consider piecemeal. Therefore, it is preferable to have feature points that are least likely to be occluded. The system can aim to alleviate occlusion likelihood by the choice of features in constructing the feature vectors.

By localizability, this refers both to the ability of features to (a) be easily detected, and (b) be consistent. Put another way, feature coordinates may be desired that are highly contrasted and uniquely defined (i.e. they correspond as much as possible to a clearly defined and detectable point in space). Returning to the introduction of anchor points, the eye center is an example of a feature which is not uniquely defined; in fact, it is difficult to define from most input images, since it is difficult if not impossible to see from a standard image and thus would require modeling based on consistent features. An example of a feature which is not easily detected (i.e. of low contrast) is the outer eye corner, as it tends to blur into the background and receive a relatively lower amount of illumination. The system aims to alleviate localizability issues by the choice of features in constructing the feature vectors.

By user phenotype independence, it refers to the ability of a given feature vector to stay consistent—for a given eye pose—between users of different ethnicity, geographic origin, age, and/or gender (to name a few). It should come as no surprise that multiple facial and eye feature dimensions vary significantly from one user to the next. As a simple example, interpupillary distance can vary from 45-80 mm for the majority of the human population; any feature vector using this that is fed to a mapping without accounting for the variance is bound to be inconsistent from user to user. The system aims to alleviate phenotype variability by feature vector normalization.

Note that in addition to alleviating phenotype variability on a per-feature-vector basis, the system also aims to do so by considering multiple feature vectors (hence the reference to more than one throughout this description). This will be described further in FIG. 7.

By facial expression independence, this refers to the effect different facial expressions will have on a given feature's coordinates. By way of example, any mouth landmark will vary significantly in position when the user changes from a neutral expression to a smile. Therefore, minimizing this variance is in the best interest of the system. The system aims to alleviate facial expression independence by the choice of features in constructing the feature vectors.

By eye-pose independence, this is concerned by the features considered for the anchor point varying based on eye pose. It should be apparent that, since one can expect and want the orientation point to vary principally by eye pose, one may also want the anchor point to vary minimally by the same. In the extreme case, where the anchor point varies in the exact same manner as the orientation point, the feature vector does not change at all and thus may be unusable. It is possible that an anchor point shows variance based on eye pose, but this variance is decoupled from the orientation point variance; in such a case, it could be that this motion can be considered within the learned mapping 216. However, introducing such a variance would only complexify the problem presented to the mapping method. Because of this, it is understandably desired to avoid any eye-pose dependency on the anchor point.

Returning to FIG. 4, we see a number of features illustrated as potential orientation points 400, and anchor points 402. Referring to orientation points, most considered points come from pupil contour points, iris contour points, or the estimated pupil and iris contour centroids. Although the pupil and iris center can be understood to not fully fit the criteria of localizability (due to not necessarily being easily detectable), they are implicitly detectable as the centroid of the associated shape or contour of said shape. In contrast with this, the points along the contour are generally high contrast, but reliably detecting a single one of these is very unlikely. Thus, generally the pupil/iris centroid are the ideal landmark coordinates to be used for the orientation point of the feature vector.

Referring to anchor points, a number of features can be considered: the inner or outer eye corner, landmarks associated with the upper or lower eyelid, landmarks associated with the eyebrow, and landmarks along the nose are just some examples. In addition to this, an anchor point may often be computed from a combination of any of these (or more):

$$P_a = \sum_{i=0}^{n} P_i$$

where $P_i$ corresponds to a feature coordinate from a set of n feature coordinates being considered. Examples of anchor points computed from a combination of feature points include: the face center, the midpoint between both eyes, and the "center of the eye" (defined as the average of all non-gaze eye points considered; not to be confused with the true 3D eye center).

During testing with an embodiment of the system, a preferred orientation point used was the pupil center, while preferred anchor points were the face center of the user and inner eye corner.

It should be noted that the use of "points" to describe orientation and anchor aspects has mostly been used for convenience and clarity. Although in the embodiments described the illustrations herein have restricted the system to defining points, it should be understood that any other indicator could be considered. For example, one might consider a distance (that has been normalized) separately from points. Additionally, although orientation aspects are described as being principally pupil or iris-based, nothing restricts them from considering other aspects. As an example, one of the present embodiments considers eyelid points in conjunction with pupil points as orientation aspects.

Once a given feature vector V has been determined at step 208, normalization 210 is required in order to minimize the effect user phenotypic variance may have on the eye orientation estimation. For context, it should be reiterated that the overall invention attempts to minimize non-eye-pose sources of variation in the input to the learned mapping 216; this allows the amount of data necessary to train or design such a learned mapping to be significantly lower than otherwise. It can also be understood that the complexity of the learned mapping would potentially be lower, since it would not need to account for these added sources of variability.

As noted in the algorithm summary of FIG. 2, the normalization approach considers statistical distributions 212 from the training data (used to determined learned mapping 216), in order to function. The general idea of the normalization method is to use a defined metric m, which considers at least one of the feature coordinates being tracked, and represents a user-variable parameter. The statistical distribution of this metric is considered to define a value associated to the distribution (such as the maximum or variance), and limit the feature vector (such as by division) by this value:

$$\underline{V} = \frac{V}{m}$$

Once this normalization has been performed, the normalized feature vector can then be fed to the learned mapping for eye orientation estimation.

Depending on the visibility, spatial resolution, and image quality of the features being considered—as well as the features themselves—, it is at times also valuable to decouple the pitch and yaw when estimating eye orientation. By this, one means considering different feature vectors to handle pitch and yaw independently (and thus, different learned mappings). This is particularly useful if it is found that one of the eye orientation angles is less accurate than the other, since merging them risks the estimation of the more accurate angles being negatively affected. This was noticed in one embodiment of the system being run on particularly low spatial resolution data, with the pitch being noticeably less accurate than the yaw. Such an embodiment highlights that, while the system permits a single learned mapping (or set of learned mappings) to be run on any input hardware, in certain cases customized mappings may be wanted. Alternatively, a set of feature vectors and normalization metrics that functions on the lowest quality input system may be desired, as it can be expected to still improve when run on higher quality input systems.

In one of the embodiments, it was found that some users benefitted from the feature vector including the pupil center—inner eye corner, while others benefitted from the feature vector including the pupil center—"eye center" (a sum of multiple eye landmark coordinates). Because of this finding, an embodiment of the system assumes a list of feature vectors which, after normalization and estimation via the mapping method 206, are combined via a weighted sum:

$$V = \{V_0, V_1, \ldots, V_n\}$$

$$V_i = P_{g,i} - P_{a,i}$$

$$\underline{V_i} = \frac{V_i}{m_i}$$

$$A_i = M_{V\text{-}to\text{-}A}\underline{V_i}$$

$$A_{final} = \sum_{i=0}^{n} w_i A_i$$

Figure 5:
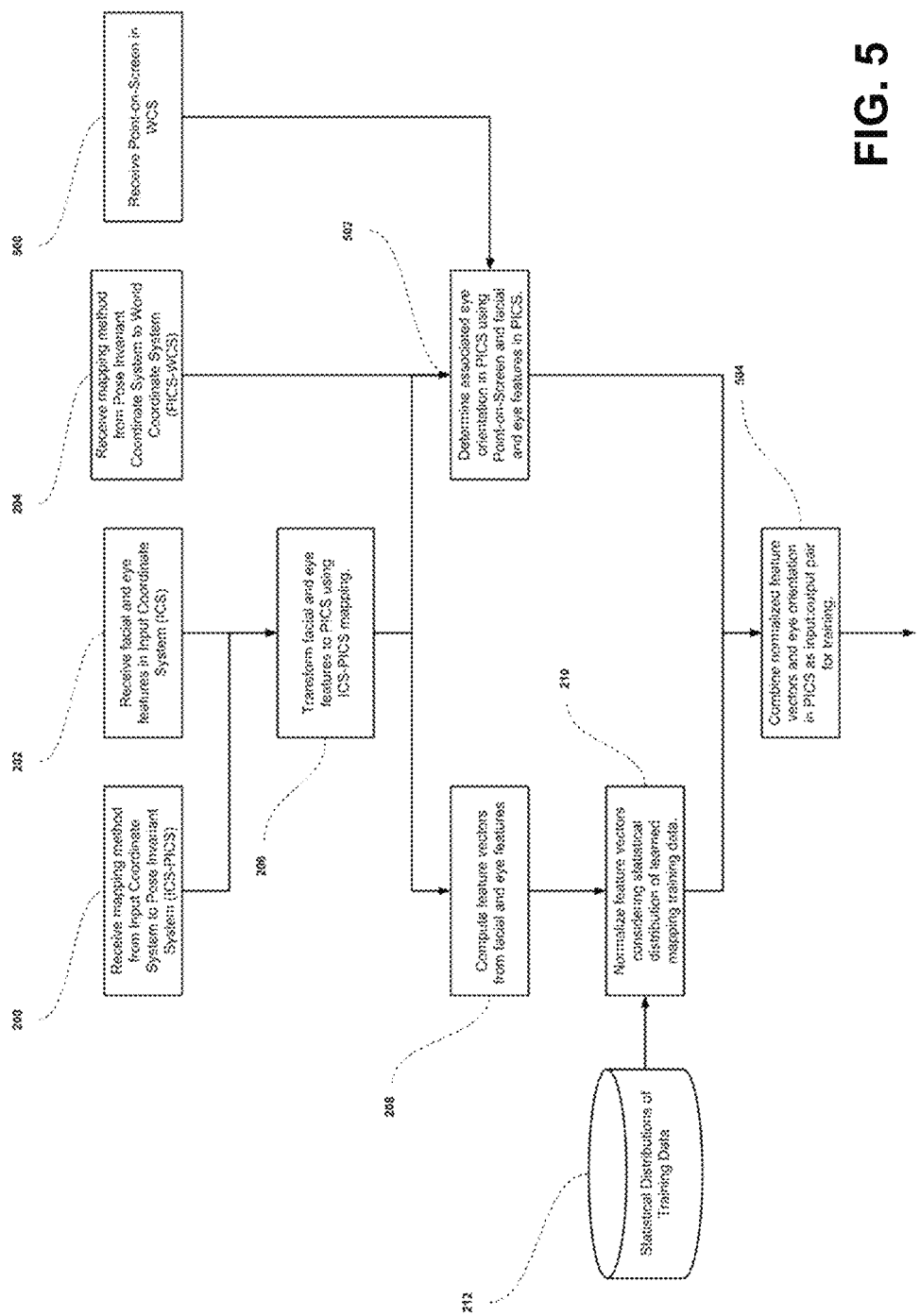
FIG. 5 shows the steps describing the training procedure for creating the learned mapping employed by the system.

The steps described in FIG. 5 illustrate the process by which the learned mapping method is trained. It can be seen that a lot of the steps are the same as those found in the eye estimation method, which uses this learned mapping. Such an approach makes sense, as the goal is to have the input data used to train a learning model match as closely as possible the input data fed to a learned mapping during the testing phase (e.g. during real-life use of it). The method described in the figure should be understood, more specifically, as corresponding to the method by which an input/output pair (for the learning mapping) is created. The goal of the method is to associate a given input feature vector to an expected output eye estimation. Given a large quantity of these input/output pairs, a mapping can be learnt.

As such, it can be seen that the training method, similar to FIG. 2, also receives a mapping method from ICS to PICS 200, facial and eye features in ICS 202, and a mapping method from PICS to WCS 204. In addition to this, a ground truth Point-on-Screen (POS) is provided in the World Coordinate System at step 500. This POS corresponds to the point on a screen where the user was looking when the other input data were recorded. Thus, one would like the mapping method to, given the proper inputs, estimate this point. The training can be seen as having two paths occurring in parallel: (a) computing the input normalized feature vectors that the learned mapping method expects as input, and (b) computing the user eye orientation in the PICS, which the learned mapping method would be expected to output for the input defined in (a). For path (a), the steps are effectively the same as that described in FIG. 2: the facial and eye feature coordinates are converted to the Pose Invariant Coordinate System at step 206; feature vectors are computed from the PICS coordinates at step 208; and the feature vectors are normalized at step 210, using statistical distribution information from the full training data 212.

For path (b), where the user eye orientation is computed in the Pose Invariant Coordinate System, we must "back raytrace" the input point-on-screen. To do this, one first defines a unit vector that describes the eye orientation in the World Coordinate System. This is accomplished by taking the point-on-screen in the WCS and a representative orientation point in the WCS (based off of the eye and facial feature coordinates received), and tracing a ray from one point to the other. In one embodiment, the eye orientation point considered was the pupil center, as it was considered a reliable orientation aspect. This ray can then be normalized into a unit vector that describes its orientation in the WCS. Then, the vector is mapped to the PICS using the inverse of the mapping method 204. The new unit vector effectively describes the eye orientation in the Pose Invariant Coordinate System.

Once the eye orientation in the PICS has been computed at step 502, and the input normalized feature vectors have been computed at step 210, all that is left is to combine the two as an input-output pair at step 504. The full set of input-output pairs from the training data can then be used to train the mapping method via any appropriate training approach.

With respect to how the data is obtained, note the following example approaches: (a) a dataset is collected offline of one to many users looking at many points on a screen, with associated recordings of them from a hardware system; (b) a dataset of one to many users is collected online via an explicit calibration procedure, with them instructed to look at preset points, and associated recordings of them from a hardware system; (c) a dataset of one to many users is collected online via an implicit procedure, with associated recordings of them from a hardware system.

Note that the described mapping method is purposefully system-agnostic. Because of this, the data collected from a hardware system (i.e. corresponding to input system data), is not required to come from the same hardware system that is used when running the method. That is, multiple datasets from completely unrelated hardware systems can be used to train the learned mapping. Afterwards, any hardware system desired can be used to run the method which uses said mapping. This can be advantageous, as it means the learned mapping can be learnt once and used on any hardware.

Similarly, the system is purposefully pose-independent. Because of this, the data collected is not required to contain many varied user poses. In fact, since both the training and testing methods first decouple user pose (via the transformation to a Pose Invariant Coordinate System), the amount of data required to be collected is much lower than would be required for a more traditional gaze estimation approach.

One additional aspect relates to the mapping approach used, as well as the minimization or maximization criteria used to train such a mapping. The reason for this may be that these particulars are not believed to be necessary for the system to operate. For clarity, however, it is noted that an exemplary embodiment has been developed using a classic convolutional neural net—batch normalization—neural net structure, including 4 layers and 220 weights. This is not the only structure of such a mapping, but rather a representative embodiment.

Next, a few optional implementations may be described. These mostly relate to the choice of data used to train the learned mapping. A choice that should be made is that of training and using a general user eye orientation mapping versus a user-specific eye orientation mapping. The reason for such a distinction should be clarified, as it relates to the calibration concept from traditional gaze tracking. When estimating a user's gaze, there is a distinction between the optical axis of the user—that is, the eye orientation that can be estimated purely considering visible features—and the visual axis of the user—i.e. the true eye orientation of the user. The cause of the distinction is that the position of the retina, where the highest proportion of photoreceptors are located, does not align perfectly with the optical axis of the eye—it is located apart from it, and varies from user to user.

Because of the training approach used to create the learned model, the output eye estimation should always correspond to a visual axis estimation, as the input is always where the user was actually looking. Thus, in the case where the training data consists of many users looking at many points on a screen, the learned mapping corresponds to an average user visual axis estimation. This is advantageous versus an optical axis estimation, because the average retina position of all users still deviates from the optical axis. Thus, the average user visual axis should, on average, provide a more accurate estimate of a user's gaze than that provided by an optical axis estimator (effectively, that provided by a geometric model).

Figure 6:
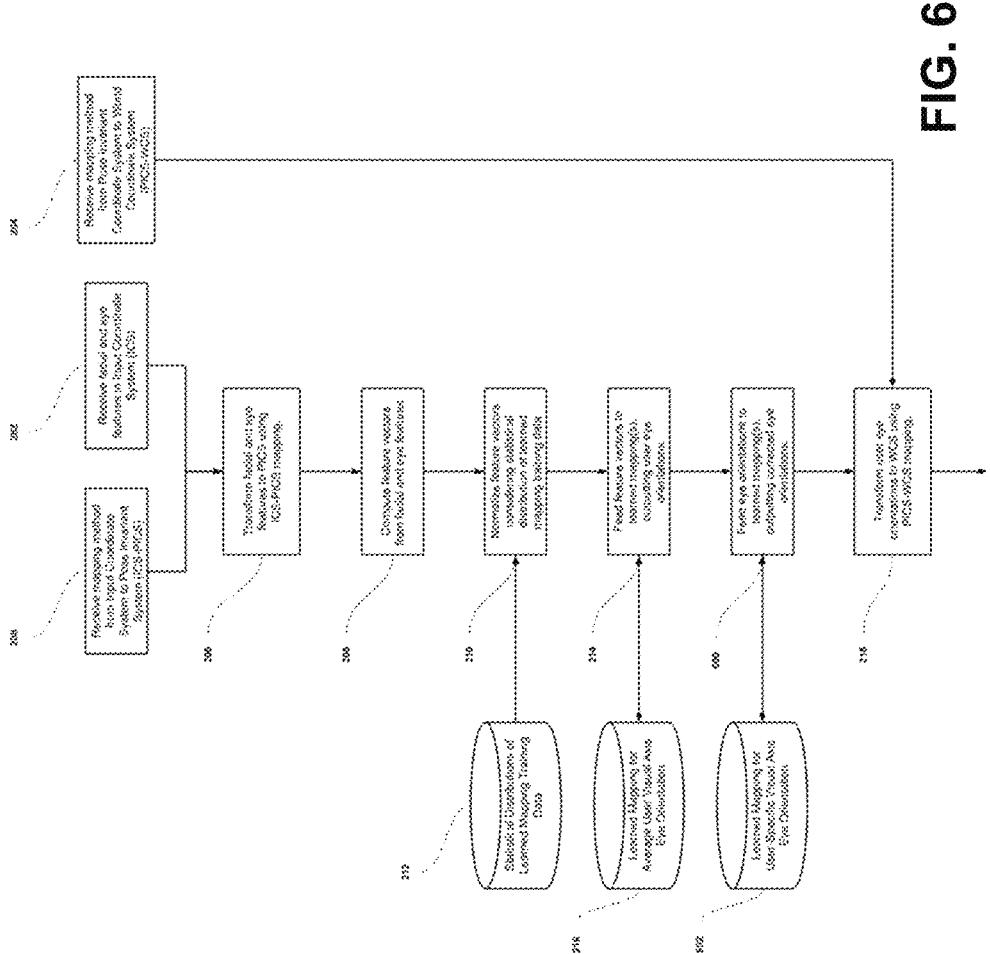
FIG. 6 shows the steps describing an enhanced embodiment, wherein an additional user-specific mapping is considered.
Figure 7:
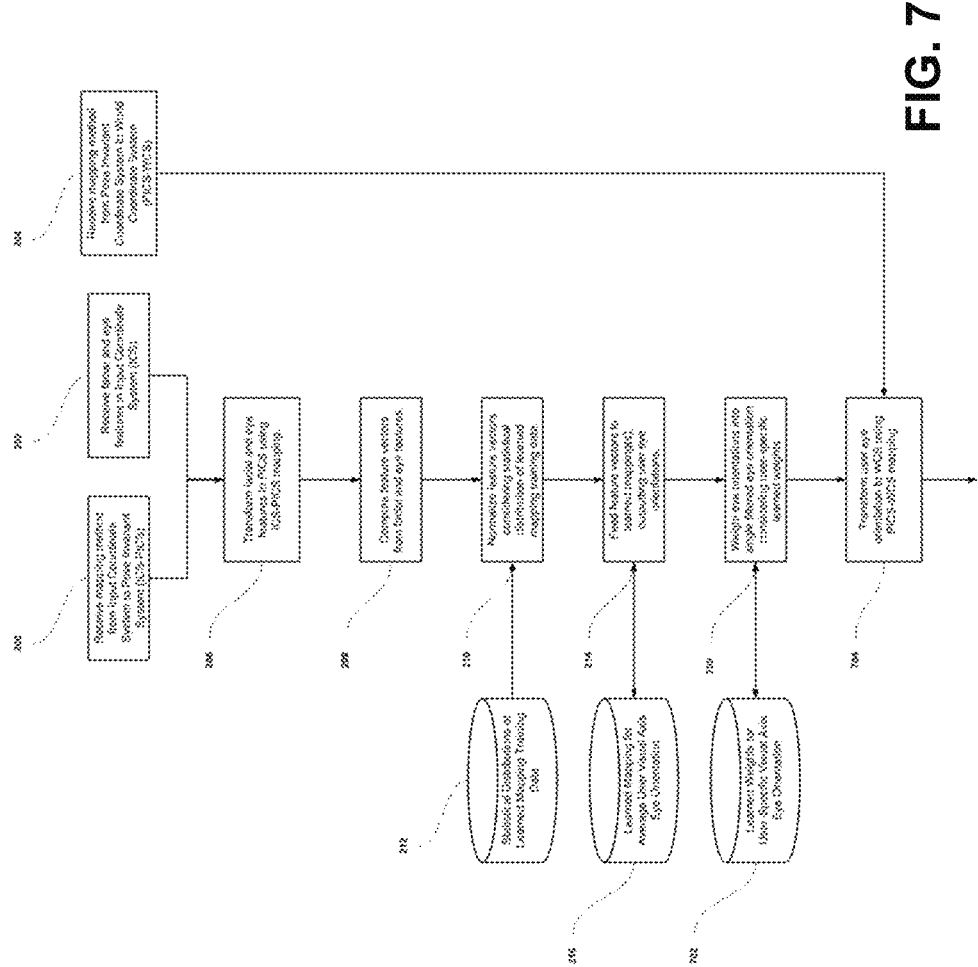
FIG. 7 shows the steps describing an enhanced embodiment, wherein a different method of providing a user-specific mapping is considered.

Rather than limit the learned mapping to a binary option of average user vs. user specific, the exemplary embodiments of FIG. 6 and FIG. 7 demonstrate ways in which a combination of the two can be achieved.

In FIG. 6, an exemplary embodiment of the system considers two learned mappings, the first estimating an average user visual axis eye orientation; the second, a user-specific visual axis eye orientation. This method is similar to that described in FIG. 2, with the main distinction happening after step 214. Once an average user visual axis eye orientation has been estimated, the results are then fed at step 600 to a learned mapping, 602, that has been trained on data from an individual user and is trained to output a new eye orientation. The difference between the learned mapping 216 and mapping 602 is simply one of data: the former has been trained on data of many users, while the latter only considered an individual user. More specifically, the latter has been trained with input-output pairs where the input consists of the output of learned mapping 216, and the output consists of the "back raytraced" eye orientation estimation from step 402 of the training method in FIG. 4. This will, in most embodiments, result from either a more standard, explicit gaze calibration procedure, or an implicit calibration process.

FIG. 7 shows a separate exemplary embodiment, with the same goal of complementing a generic user mapping with a user-specific one. In this case, the differentiation occurs after step 214, when the output user eye orientations are then fed to step 700. At step 700, the different eye orientation estimates are processed via a weighted average, to create a singular user-specific eye orientation estimate. The weighted average considers user-specific weights 702, which have been learnt via the obtainment of prior data (in any of the methods described before). The final eye orientation estimate is then converted to the WCS using the PICS-WCS mapping at step 704.

In performing the user-specific mapping in this manner, one can allow an output that prioritizes feature vectors that work better for the particular user. It also highlights a particular difference between the embodiment of FIG. 7 and the other embodiments: whereas the other embodiments (and the general method) allow for multiple feature vectors, they simply output the multiple eye orientation estimates based on these vectors. Thus, the general approach does not require multiple feature vectors, and does not necessarily involve smartly averaging said estimates. The embodiment of FIG. 7, however, does require these different estimates, and uses the weighting of them to optimize the final eye orientation estimate for a particular user.

Relating to FIG. 7 and its use of learnt weights: this can analogously be complemented with user pose and/or user orientation weights. By this, it is meant that a separate embodiment could involve learnt weights 702, which are different depending on the user's position and orientation at any given time.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the system, any component of or related to the system, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

REFERENCES

1. Hennessey, C. A., Lawrence, P. D. "Methods and apparatus for estimating point-of-gaze in three dimensions". U.S. Pat. No. 8,457,352B2. 2007, May 23.
2. Amir, A., Flickner, M. D., Koons, D. B., & Morimoto, C. H. "System and method for eye gaze tracking using corneal image mapping". U.S. Pat. No. 6,659,611B2. 2001, January 28.
3. Yin, L. & Reale, M. "Real-time eye tracking for human computer interaction". U.S. Pat. No. 8,885,882B1. 2011, July 14.
4. Ji, Q. & Zhu, Z. "Calibration-free gaze tracking under natural head movement". U.S. Pat. No. 7,306,337B2. 2003, March 06.
5. 陈杰春, & 赵丽萍. "Apparatus and method for measuring a gaze point based on the video image and the artificial neural network". Chinese Patent CN103356163B. 2013, July 08.
6. Wang. J, Zhang, G., & Shi, J. "2D Gaze Estimation Based on Pupil-Glint Vector Using an Artificial Neural Network". Applied Sciences. 6. 174. 2016, June
7. Varsha, P. & Patel, J. "Eye Gaze Tracking System Using Neural Networks". International Journal of Review in Electronics and Communications Engineering (IJRECE) Vol. 2, No. 2. 2014.
8. Gneo, M., Shmid, M., Conforto, S. & D'Alessio, T. "A Free Geometry Model-Independent Neural Eye-Gaze Tracking System". Journal of neuroengineering and rehabilitation. 9. 82. 2012, November
9. Torricelli, D., Goffredo, M., & Conforto, S., Schmid, M., & D'Alessio, T. "A novel neural eye gaze tracker". 2006, January
10. Torricelli, D., Conforto, S., Schmid, M., & D'Alessio, T. "A neural-based remote eye gaze tracker under natural head motion". Computer methods and programs in biomedicine.
92. 66-78. 2008, November
11. Back, D. "Neural Network Gaze Tracking using Web Camera". PhD Thesis, Linkoping
University. 2006.
12. Cheung, YM & Peng, Q. "Eye Gaze Tracking With a Web Camera in a Desktop Environment". IEEE Transactions on Human-Machine Systems. 45. 1-12. 2015, August
13. Skodras, E., Kanas, V., Fakotakis, N. "On Visual Gaze Tracking Based on a Single Low Cost Camera". Signal Processing: Image Communication. 36. 2015, June
14. Skodras, E. "Facial features extraction and estimation of gaze direction in human computer interaction". PhD Thesis, University of Patras. 2016, November
15. Wild, DJ. "Gaze Tracking Using a Regular Web Camera". Bachelor of Science Thesis,
Rhodes University. 2012, November
16. Sewell, W., & Komogortsev, 0. "Real-time eye gaze tracking with an unmodified commodity webcam employing a neural network". Proceedings of the 28th International Conference on Human Factors in Computing Systems, CHI 2010, Extended Abstracts. 2010, April 15.
17. Baluja, S., & Pomerleau, D. "Non-Intrusive Gaze Tracking Using Artificial Neural Networks". Advances in Neural Information Processing Systems 6, 7th NIPS Conference. 1993, January
18. Zhang, X., Sugano, Y., Fritz, M., & Bulling, A. "Appearance-based Gaze Estimation in the Wild". Conference on Computer Vision and Pattern Recognition, CVPR 2015. 2015, June
19. George, A., & Routray, A. "Real-time Eye Gaze Direction Classification Using Convolutional Neural Network". 2016.
20. K. Krafka, A. Khosla, P. Kellnhofer, H. Kannan, S. Bhandarkar, W. Matusik and A. Torralba. "Eye tracking for everyone". IEEE Conference on Computer Vision and Pattern Recognition (CVPR) 2016. 2016.
21. Stiefelhagen, R., Yang, J., & Waibel, A. "Tracking Eyes and Monitoring Eye Gaze". 1999, October
22. Holland, C., & Komogortsev, 0. "Eye Tracking on Unmodified Common Tablets: Challenges and Solutions". ACM Eye Tracking Research & Applications Symposium (ETRA) 2012. 2012, March 23. Tan, K. H., Kriegman, D. J., Ahuja, N. "Appearance-based eye gaze estimation".
Applications of Computer Vision (WACV), 2002. 2002, December 4.
24. Casil, I. A., Geslani, G. R., Nia, B. G., Sayareh, R., & Beltran, A. "Eye Gaze Direction Classification Using Artificial Neural Network". Institute of Electronics Engineers of the Philippines (IECEP) 2013, Journal. 2. 22-26. 2013, June

The invention claimed is:

1. A method of estimating orientation of a user's eyes in a scene using one or more learned mappings, comprising:
   a. receiving coordinates of one or more facial and eye features of at least one eye of the user, in a defined coordinate system corresponding to an input coordinate system;
   b. receiving a first mapping method that maps data from the input coordinate system to a predefined coordinate system, defined such that positions of the one or more facial and eye features do not vary due to user rotation or translation in a world coordinate system, corresponding to a pose invariant coordinate system;
   c. receiving a second mapping method that maps data from the pose invariant coordinate system to the world coordinate system;
   d. transforming the one or more facial and eye feature coordinates from the input coordinate system to the pose invariant coordinate system using the first mapping method;
   e. computing one or more feature vectors out of the transformed one or more facial and eye feature coordinates;
   f. normalizing the one or more feature vectors considering statistical distributions of data used to train the one or more learned mappings;
   g. feeding the one or more normalized feature vectors to the one or more learned mappings, the mappings having been trained to output orientation information of one or more of the user's eyes in the pose invariant coordinate system; and
   h. determining position and orientation of the one or more of the user's eyes in the world coordinate system, using the orientation information of the one or more of the user's eyes in the pose invariant coordinate system and the second mapping method.

2. The method of claim 1, wherein the one or more facial and eye features of the user are obtained via a face tracking system.

3. The method of claim 2, wherein the face tracking system takes as input a single sensor video feed providing images containing at least a partial visibility of the user.

4. The method of claim 1, wherein the first mapping is computed considering the one or more facial and eye features in the input coordinate system, a projection model of one or more sensors used as input for the face tracking system, an estimated position of the user in the world coordinate system, and a model relating pose invariant region to the one or more facial and eye features.

5. The method of claim 1, wherein the second mapping is computed considering a 3D rotation and translation of face or head vector of the user in a camera coordinate system, and a mapping from the camera coordinate system to the world coordinate system.

6. The method of claim 4, where the position estimate of the user in the world coordinate system is computed considering the one or more facial and eye features of the user and comparing them to a known distribution of the one or more facial and eye features.

7. The method of claim 4, wherein the model of the pose invariant region exists within the face tracking system, and the pose invariant region corresponds to a facial model.

8. The method of claim 1, wherein the one or more facial and eye features transformed to a face coordinate system comprises one or more of:
   a coordinate within or computed from a pupil;
   a coordinate within or computed from a limbus;
   a point along an upper or lower eyelid;
   a coordinate within or computed from an inner or outer eye corner.

9. The method of claim 1, wherein the one or more learned mappings have been trained on data of multiple users looking at known points in a scene.

10. The method of claim 1, wherein the one or more learned mappings have been trained on data of the user looking at known points in a scene.

11. The method of claim 9, wherein the data is obtained via multiple users looking at predefined points, via an explicit process.

12. The method of claim 9, wherein the data of multiple users is obtained via an implicit process, capable of determining instances in time where a user had a high probability of looking at particular points in a scene.

13. The method of claim 10, wherein the data is obtained via the user looking at predefined points, via an explicit process.

14. The method of claim 10, wherein the data of the user is obtained via an implicit process, capable of determining instances in time where the user had a high probability of looking at particular points in a scene.

15. The method of claim 1, wherein the outputted orientation information of the one or more eyes from the one or more learned mappings is further fed to a second set of the one or more learned mappings, the mappings having been trained to output the orientation information of one or more of the user's eyes in the pose invariant coordinate system, and having been trained on data of the user.

16. The method of claim 1, wherein the one or more learned mappings have been trained on data of a single user looking at known points in a scene.

17. The method of claim 1, wherein the data is obtained via the user looking at predefined points, via an explicit process.

18. The method of claim 17, wherein data of the user is obtained via an implicit process, capable of determining instances in time where the user had a high probability of looking at particular points in a scene.

19. The method of claim 1, wherein the outputted orientation information of the one or more eyes from the one or more learned mappings is further fed to an averaging step, wherein one or more eye orientation estimates are averaged via a weighted average to output a single eye orientation estimate for the user.

20. The method of claim 19, wherein weights used in the weighted averaging have been trained on data of multiple users looking at known points in a scene.

21. The method of claim 19, wherein weights used in the weighted averaging have been trained on data of the user looking at known points in a scene.

22. The method of claim 20, wherein the wherein the data is obtained via multiple users looking at predefined points, via an explicit process.

23. The method of claim 20, wherein the data of multiple users is obtained via an implicit process, capable of determining instances in time where a user had a high probability of looking at particular points in a scene.

24. The method of claim 21, wherein the data is obtained via the user looking at predefined points, via an explicit process.

25. The method of claim 21, wherein the data of the user is obtained via an implicit process, capable of determining instances in time where a user had a high probability of looking at particular points in a scene.

26. A non-transitory computer readable medium storing computer executable instructions for estimating orientation of a user's eyes in a scene using one or more learned mappings, comprising instructions for:
 a. receiving coordinates of one or more facial and eye features of at least one eye of the user, in a defined coordinate system corresponding to an input coordinate system;
 b. receiving a first mapping method that maps data from the input coordinate system to a predefined coordinate system, defined such that positions of the one or more facial and eye features do not vary due to user rotation or translation in a world coordinate system, corresponding to a pose invariant coordinate system;
 c. receiving a second mapping method that maps data from the pose invariant coordinate system to the world coordinate system;
 d. transforming the one or more facial and eye feature coordinates from the input coordinate system to the pose invariant coordinate system using the first mapping method;
 e. computing one or more feature vectors out of the transformed one or more facial and eye feature coordinates;
 f. normalizing the one or more feature vectors considering statistical distributions of data used to train the one or more learned mappings;
 g. feeding the one or more normalized feature vectors to the one or more learned mappings, the mappings having been trained to output orientation information of one or more of the user's eyes in the pose invariant coordinate system; and
 h. determining position and orientation of the one or more of the user's eyes in the world coordinate system, using the orientation information of the one or more of the user's eyes in the pose invariant coordinate system and the second mapping method.

27. A system for estimating orientation of a user's eyes in a scene using one or more learned mappings, the system comprising a processor and memory, the memory storing computer executable instructions that when executed by the processor cause the system to:
 a. receive coordinates of one or more facial and eye features of at least one eye of the user, in a defined coordinate system corresponding to an input coordinate system;
 b. receive a first mapping method that maps data from the input coordinate system to a predefined coordinate system, defined such that positions of the one or more facial and eye features do not vary due to user rotation or translation in a world coordinate system, corresponding to a pose invariant coordinate system;
 c. receive a second mapping method that maps data from the pose invariant coordinate system to the world coordinate system;
 d. transform the one or more facial and eye feature coordinates from the input coordinate system to the pose invariant coordinate system using the first mapping method;
 e. compute one or more feature vectors out of the transformed one or more facial and eye feature coordinates;
 f. normalize the one or more feature vectors considering statistical distributions of data used to train the one or more learned mappings;
 g. feed the one or more normalized feature vectors to the one or more learned mappings, the mappings having been trained to output orientation information of one or more of the user's eyes in the pose invariant coordinate system; and
 h. determine position and orientation of the one or more of the user's eyes in the world coordinate system, using the orientation information of the one or more of the user's eyes in the pose invariant coordinate system and the second mapping method.

* * * * *